United States Patent [19]
Flint et al.

[11] 3,775,586
[45] Nov. 27, 1973

[54] ENCLOSED LASER APPARATUS WITH REMOTE WORKPIECE CONTROL

[75] Inventors: Graham W. Flint, Maitland; William C. Hudson, Orlando; Thomas G. Crow, Orlando; George R. Downes, Jr., Orlando, all of Fla.

[73] Assignee: International Laser Systems, Inc., Orlando, Fla.

[22] Filed: Aug. 10, 1971

[21] Appl. No.: 170,464

[52] U.S. Cl. .................. 219/121 L, 331/94.5 A
[51] Int. Cl. ............................. B23k 27/00
[58] Field of Search ............. 219/121 R, 121 L, 219/121 EB, 384, 131; 331/94.5 A

[56] References Cited
UNITED STATES PATENTS

| 3,348,547 | 10/1967 | Kavanagh | 219/121 L |
| 3,420,719 | 1/1969 | Potts | 219/121 L |
| 3,387,109 | 6/1963 | Bruma et al. | 214/121 L |
| 3,369,101 | 2/1968 | Curcio | 219/121 L |
| 3,626,141 | 12/1971 | Daly | 219/121 L |
| 3,266,393 | 8/1966 | Chitayat | 219/121 L |

OTHER PUBLICATIONS

"Laser Piercing and Reworking of Diamond Dies", Wire and Wire Products, Sept. 1966, pp. 1354–13577, 1399–1401.
"Laser Scribing Apparatus", Western Electric Technician Digest, No. 20, October 1970, pp. 19–20.
"Carbon Dioxide Laser Welding", Welding Journal, October 1969, pp. 800–806.
"Precise Perforations Every Time", The Tool and Manufacturing Engineer, November 1969, pp. 46–49.

Primary Examiner—C. L. Albritton
Assistant Examiner—George A. Montanye
Attorney—Robert W. Duckworth et al.

[57] ABSTRACT

A welding apparatus for welding dental bridges, dental restorations, and the like, utilizing a laser beam for the welding, and including remote positioning of a prosthesis on a platform and direct viewing during the welding.

4 Claims, 4 Drawing Figures

George R. Downes Jr.
Graham W. Flint
William C. Hudson
Thomas G. Crow
INVENTORS

BY Duckworth & Hobby
ATTYS.

George R. Downes Jr.
Graham W. Flint
William C. Hudson
Thomas G. Crow
INVENTORS

BY Duckworth & Hobby
ATTY'S.

ENCLOSED LASER APPARATUS WITH REMOTE WORKPIECE CONTROL

BACKGROUND OF THE INVENTION

The present invention relates to welders and especially to welders using laser beams for welding dental prostheses, and the like.

In the past, dental technicians have typically joined bridgework elements in dental laboratories, with gold solder heated with a blow torch. This was a time consuming process which produced at best inconsistent results and wasted valuable material. It was to improve upon these prior methods of joining bridgework elements that research was begun investigating new techniques for utilizing a laser welding system for welding bridgework and similar items in dental laboratories. Laser welding has been investigated for a number of years and lasers have been used in medical work, especially laser surgical instruments including devices for welding the cornea of an eye. Finally, one prior art method suggests making dental porcelain restorations in artificial teeth by utilizing a laser for fusing silica and porcelain alone or to metal or ceramic sub-structures.

By lasers it is meant the present invention deals with a specific apparatus for laser welding bridgework and initial tests have shown advantages over prior methods of joining bridgework with gold solder. It is one advantage of the present invention to substantially reduce the time required to fabricate a bridgework joint from approximately one hour to approximately four minutes, while yielding welds of superior strength.

It is another object of the present invention to produce a dental welder which allows mouth try-ins of finished but un-united partial prostheses which can be laboratory welded within minutes and then seated in the mouth without undue waiting by or a reappointment by the patient.

Another advantage of the present invention is that it avoids all heat distortion of the prosthesis caused by investment expansion, uneven cooling and solder shrinkage.

It is another advantage of the present invention that it allows greater accuracy in the assembly of bridgework for providing a more accurate seating of a prosthesis in the mouth of a patient.

Other advantages include the production of welds without the use of another alloy such as solder, and repairs to restorations which have broken can be made without the need for stripping the veneering plastic or porcelain material from the prosthesis. A simplified operating procedure is provided for and less skilled personnel can be trained quickly to produce routinely and uniformly high quality connections between bridgework.

SUMMARY OF THE INVENTION

The present invention relates to laser welders and especially to a laser dental welder apparatus surrounded and enclosed by case and operable by controls from the exterior of the case. A movable platform located inside the case is remotely controlled or adjusted on an x–y–z axes from the exterior of the case by an operator. A laser for producing a partially coherent beam of electro-magnetic radiation of a predetermined wavelength is provided having a pumping means for exciting the laser, whixh laser may be fired by the operator. The laser beam is directed by a lens system to a predetermined point on a prosthesis, or the like, located on the controllable platform after the platform has been adjusted to align the object thereon with a spot to be welded. A viewing screen is provided for viewing the platform from exterior of the case, which viewing screen has a filter in its optical path to the platform and is transparent to visible light for viewing the platform while being adapted to absorb or reflect radiation in the laser's wavelength to prevent damage to the operator's eyes. The laser fires its beam into a beam splitter coated on one surface for maximal reflection of a laser beam into a focusng lens system which focuses the beam to a point on the platform. A filter wheel has been placed in the laser beam's path so as to provide a selection of a plurality of conditions in the path of the laser beam; one condition having nothing in the laser's path, while other conditions provide filters or diffusers singly or in combination for reducing the power of the laser and for varying the spot size of the laser beam whereby a plurality of energies or spot sizes can be provided. The platform is controlled by being connected to a member which is supported in three directions by a plurality of rods and slidably mounted in each direction, and movable by the exterior controls and having rapid and fine adjustments thereto.

Other features, such as an interlock in the door of the casing, prevent accidental firing with the door in an open position, and the beam splitting lens in the laser's path allows a reading of the power of the laser being fired.

BRIEF DESCRIPTION OF THE DRAWINGS

Other objects, features and advantages of this invention will be apparent from a study of the written description and the drawings, in which.

DESCRIPTION OF THE PREFERRED EMBODIMENT

Figure 1:
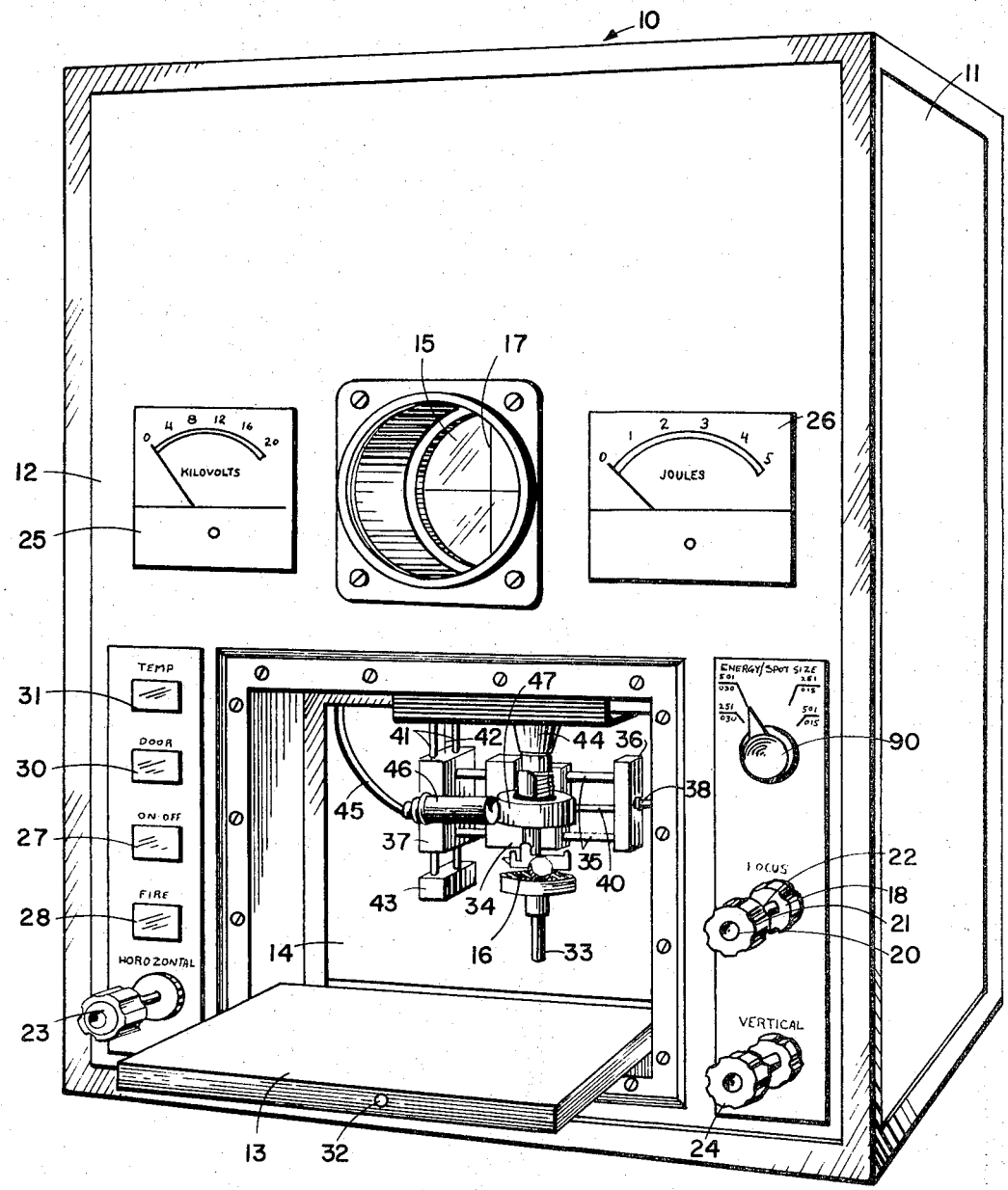
FIG. 1 shows a perspective view of one embodiment of the present invention.

Referring now to FIG. 1, a perspective view of a laser welding apparatus 10 is shown having a casing 11 with a front panel 12 thereon, and a door 13 in the front panel 12 opening to an interior cavity 14 within the dental laser welder 10. The front panel has a viewing screen 15 therein adapted for an operator to view the top of the platform 16 or an object placed on platform 16 from exterior of the casing 11, which viewing screen includes crosshairs 17 for making adjustments to the location of the platform 16 relative to the viewing screen 15. Platform 16 is herein meant to include any work supporting or holding surface or means with or without means for attaching the workpieces thereto and could be removable for attaching and removing workpieces such as dental bridges. A laser located in the welder 10 is adapted to produce a beam of radiation at a focused point on the platform 16 for welding an object placed on the platform 16 and aligned by an operator by a plurality of exterior controls. Focus control 18 moves platform 16 in a vertical direction or up and down by pushing a button 20 on the end of the handle 21 of the control 18 and sliding the shaft 22 along its longitudinal axis and out of the panel 12 until an approximate adjustment is reached. At this point the hand 21 is rotated to get a find adjustment of the platform 16 in its vertical position. This control operates in a similar manner to the throttle controls of certain types of light aircraft. The horizontal control 23 operates in the same manner as the focus control 18 except that it controls the platform along a horizontal axis of movement of the platform 16. The vertical control 24 also operates in the same manner as the focus control 18 except that it moves the platform along a horizontal axis between the back of the welder 10 and the door 13 to and fro within the apparatus. Thus an operator from the exterior of the welder 10 can look through the viewing screen 15 and align an object on platform 16 with the crosshairs 17 of the viewing screen by operating the controls 18, 23 and 24 to align platform 16 along an x–y–z axes positioning system so that platform 16 can be located or positioned anywhere within its range for aligning an object thereon as desired. The front panel 12 has a kilo voltmeter 25 thereon for measuring the voltage in the power supply and a power meter 26 for reading the power of a laser in joules. The front panel also provides a switch 27 for switching the laser welder on or off for starting the charging of the laser power supply which can be read on the meter 25. A fire switch 28 for firing the laser following alignment of the platform 16 is provided. A red light 20 indicates that the door is open and that the device can not be fired, and a red light 31 indicates when the temperature is exceeding safe limits. When the red light 30 is visible, the fire button 28 will not fire the apparatus inasmuch as an interlock is provided including a mechanism 32 located on the door 13 for disabling the laser to prevent firing of the laser welded, with the door open and risking damage to an operator or individual standing nearby. Platform 16 may be adjusted on a downward extending shaft 33 connected to block member 34. Block member 34 freely rides on a pair of shafts 35 which are connected at one end to a shaft holding member 36 and the opposite end by a block member 37 similar to the block member 34. Shaft holding member 36 has a cable 38 attached thereto with a movable portion 40 extending through the block 36 and attached to the block 34 so that operation of the vertical control 24 merely moves the cable 40 inside of the cable covering 38 back and forth, thereby moving the block 34 on the shafts 35. The block 34 may have linear bearings or similar bearings located therein for the shafts 35 to ride on but is allowed to freely ride on the shafts 35 so that the attached platform may be controlled by the operation of the control 24. The shafts 35 are attached to the block 37 which freely rides on a second pair of shafts 41 similar to shafts 35 and are similarly pulled by a cable 42 operated by the focus control 18 for moving the platform 16 along a vertically extending axis or up and down. These shafts 41 are held by shaft holding member 43 in a fixed manner at one end and at the other end are held by a third block member not shown in this view but similar to the block member 34 and 37 for controlling the movement of the platform in a second horizontal direction by the horizontal control 23, as will be described in more detail in connection with FIG. 4. A focusing lens systems casing 44 can be seen and is used to focus the laser beam onto the platform 16. A power cable 45 leads to a fluorescent ring lamp located in reflector 47 which is mounted on the objective lens housing 44. The fluorescent lamp illuminates platform 16 and a work object thereon. A power connector 46 connects cable 45 to the lamp.

Figure 2:
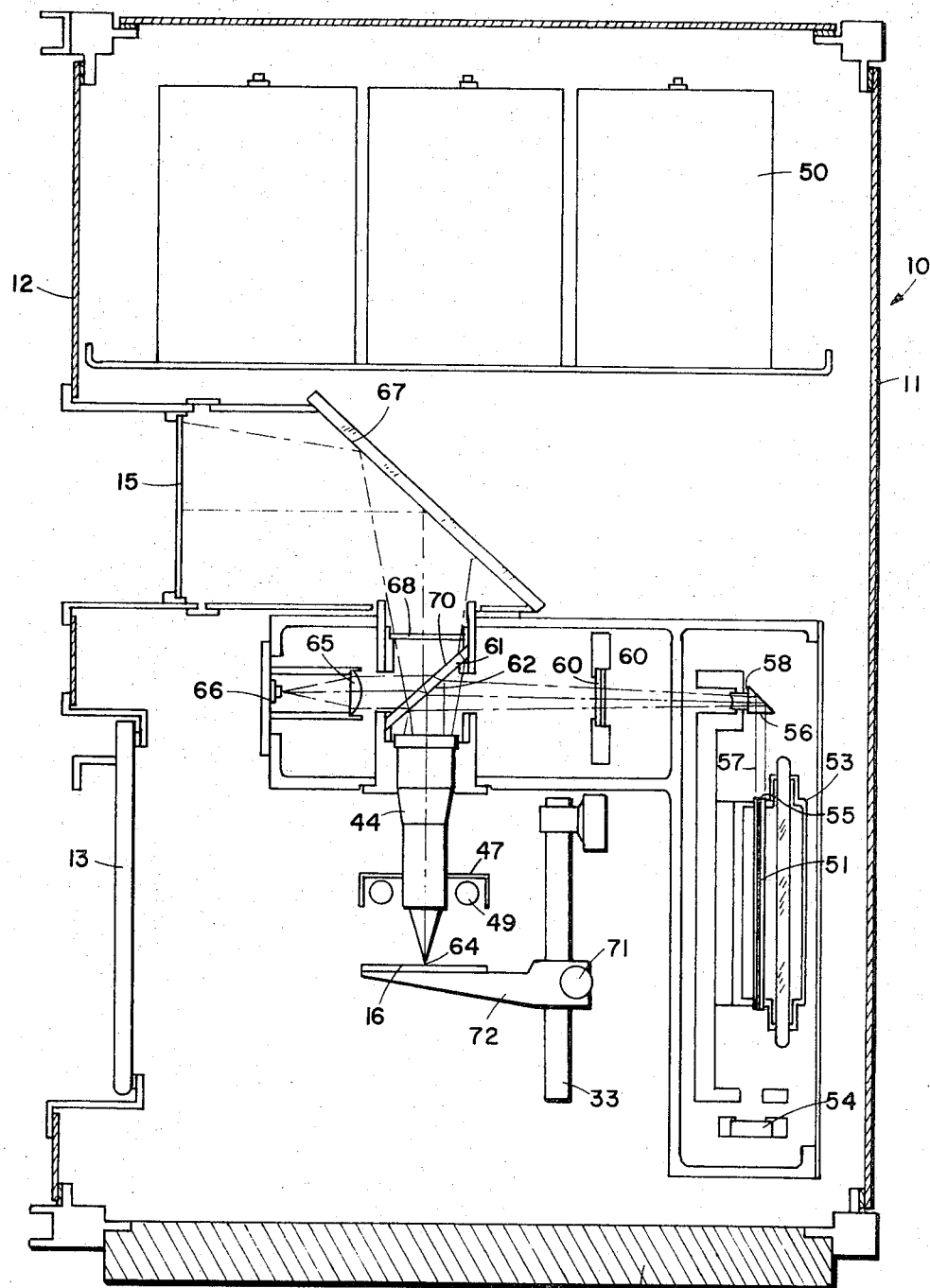
FIG. 2 shows a sectional view of the embodiment of FIG. 1.

Referring now to FIG. 2, a better operation of the system can be understood by a sectional view of the laser welder 10 having casing 11 with a front panel 12 and in which the interior can be seen to have a power supply 50 and laser rod 51 with a flashlamp 52 located in a cavity 53. Laser rod 51 has a substantially 100 percent reflective mirror 54 located at one end and may have the opposite end surface 55 partially reflective, such as 65 percent reflective, for generating the operation of the laser. It should of course be realized that a separate partially reflective surface could be provided external to the laser rod the prism 56 could be made partially reflective, without departing from the spirit and scope of the invention. The prism 56 directs the laser beam 57 at right angles but also includes a negative lens 58 incorporated into one side thereof which expands beam 57 slightly prior to it passing through an opening in a filter diffuser wheel 60 which wheel allows beam 57 to pass directly through without any interference or alternatively, can be rotated to align different openings in the wheel 60 with different combinations of a filter for reducing the power of beam 57 or varying the size of the spot to be produced by the beam by a diffuser lens located therein. Beam 57 is then impinged upon a beam splitting member 61 which has sides 62 coated for maximum reflection of the laser energy which laser energy will depend upon the particular type of laser material 51 utilized. This, however, reflects the beam into the focusing lens casing 44 which has an objective end 63 surrounded by an illumination lamp 49 having reflector 47 as already described in connection with FIG. 1. The lens system 44 focuses the beam 57 to a point or small spot 64 on the platform 16. The beam splitter 62 allows a small amount of energy from the laser beam 57 to pass therethrough and to pass through a lens 65 for focusing onto a silicon photo detector or similar optical measuring element 66 which provides a reading on the meter 26 on the front panel 12 (FIG. 1).

The viewing screen 15 allows the operator to view into the casing 11 which provides a path of light through an angled mirror 67 directing the light through a filter 68 which filter is transparent to visible light so that the viewer can see through it, but the filter is adapted to absorb the wavelengths produced by the laser rod 51 and beam 57 so that the operator will have his eyes protected against the laser energy in beam 57 by the filter 68. That is, the filter 68 blocks wavelengths in predetermined frequencies including the laser operating frequency while being substantially transparent to other frequencies including the portions of visible frequencies so that an operator can see therethrough and can also see through lens 61 which is coated on side 70 for maximum visibility for maximum passing visible light energy so that the viewer looking at screen 15 has exactly the same view as the laser beam 57 and can directly view the operation of the laser during the welding operation as well as aligning an object on the platform 16 for the welding operation. This view also shows the door 13 in a closed position and the platform 16 riding on the shaft 33 which has a handle 71 threaded to a bracket 72 for tightening around the shaft 33 for holding platform 16 in a desired adjustment. The unit 10 also has a base 73 which it sets on.

Figure 3:
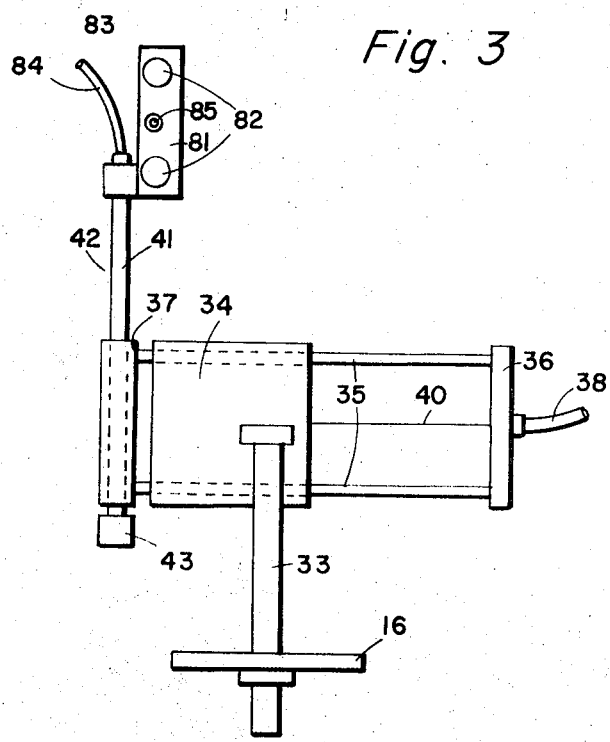
FIG. 3 shows a sectional view of platform adjusting system.

FIG. 3 shows the operation of the control of the platform 16 which rides on a shaft 33 which is fixedly connected to the movable block 34 riding on the pair of shafts 35 which are fixedly attached together by shaft holding member 36, which has the cable 40 passing from its shielded covering 38 attached to the block 34, while the covering is attached to block 36 allowing the block 34 to slide on the shafts 35 freely at the control of the cable 40. Shafts 35 are similarly also fixedly attached to a movable block 37 which rides on a pair of shafts 41 which are fixedly held together by shaft holding member 43 and are attached to a block 81 which is similar to the block 34 and 37 and which rides on a pair of shafts 82. The cable 42 is attached to a block or shaft holding member 83 which attaches the cable and cable covering 84 thereto and allows the cable to pass therethrough and connect to the block 37. The block 81 similarly freely rides on the shaft 82 and has a cable 85 attached thereto for moving the block 81 to position along the shafts 82. The movement of block members 34, 37 and 81 along shafts 35, 41 and 82 respectively, allows the movement of the platform in three directions, or along an $x\ y\ z$ axes system, for positioning the platform 16 in any position desired by the remote controls 18, 23 and 24 of FIG. 1. The initial adjustment of the platform 16 could also be made on shaft 33, depending upon the welding operations to be performed.

Figure 4:
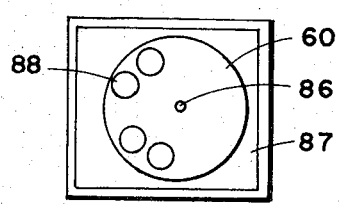
FIG. 4 shows a view of the filter wheel for use in accordance with the present invention.

FIG. 4 gives a more detailed view of the filter and diffuser wheel 60 which rotates on a center axis 86 and is framed in a frame section 87. This particular wheel has four openings 88 therein, but could of course have more as needed. The wheel is rotated by control 90 located on the front panel 12 of the welder 10 (FIG. 1) which is rotated to four positions as illustrated on the front panel to determine the energy and spot size. One opening 88 can for instance have no covering thereover, allowing the full energy of the laser to pass therethrough. Another opening can include a filter for reducing of the power in the laser beam passing therethrough, while a third opening could include a diffuser plate for making the beam larger, if desired, and a fourth opening could contain both a diffuser plate and a filter for reducing the power and the spot size of the laser beam passing therethrough. The wheel could also contain additional openings if desired, with different filter materials for varying the power, but as applied to dental work, experiments have shown predetermined energy and spot sizes produced the most satisfactory results, and the welder 10 in this case is adjusted for these particular operations. The power can of course also be reduced or adjusted by varying the power supply voltage.

The present invention is not intended to be limited to any particular embodiment but an operative device has been obtained by utilizing a neodymium doped glass laser with a laser beam collimating and focussing optics, a coacial four-power magnified optical viewing system as described with a front panel $x\ y\ z$ positioning along with a power supply including an energy storage capacitance and pulse forming network in a closed cycle liquid cooling system to produce a completely self-contained unit operating a 110 Volt power source for desk top operation. Two pulse energy levels: 2.5 and 5.0 joules, and two spot sizes: .38 mm and .76 mm, along with combination of these energy levels and spot sizes have been placed into the operation in a system having a pulse length of 2 milliseconds and maximum pulse rate of 30 per minute. The laser unit produces a 1.06 micron laser wavelength and has been used to weld gold fixed bridgework along with other such alloys as chrome, cobalt and palladium-gold. The neodymium glass rod producing the 1.06 micron output in the infrared portion of the spectrum may be obtained commercially and the energy measuring system 66 may include the 2 inch focal length lens 65 along with a 12 gram silicon photodiode for sensing energy from the 90° beam splitter 61 which may then be read on the 100 microammeter for determining the power of the laser. The flashlamp 52 can be a standard zenon flashlamp commonly used in laser work. Other embodiments might include different types of lasers, different energy levels and spot sizes along with different optics, without departing from the spirit and scope of the invention.

The present invention is not to be construed as limited to the particular forms disclosed herein, since these are to be regarded as illustrative rather than restrictive. I claim:

1. A laser welder apparatus comprising in combination: a platform, casing means for enclosing said platform, laser means in said casing means for producing a beam of coherent light, optical means for directing the laser beam onto the platform, said optical means including a negative lens located in the path of the beam for spreading the beam, an opening in said casing means, a viewing screen covering the opening, a filter means transparent to visible wavelength but absorbtive of the laser beam located in a line of sight between the viewing screen and platform, means for moving a beam diffuser plate for carying the laser beam spot into the path of the laser beam following the negative lens, entry means through said casing means for inserting and removing objects from said platform, means extending external to said casing means for moving said platform in three directions, said means for moving comprising: a first block slidably attached to at least one first rod, said platform being attached to said first block, first means extending exterior to said casing means for causing said first block to slide in a first direction, a second block to which said first rod is attached, said second block being slidably attached to at least one second rod, second means extending exterior to said casing means for causing said second block to slide in a second direction, a third block to which said second rod is attached, said third block being slidably attached to at least a third rod mounted in said casing means, and third means extending exterior to said casing means for moving said third block in a third direction.

2. The apparatus in accordance with claim 1 in which said means for moving a beam diffuser plate into the path of a laser beam includes means to move a power reducing filter into the path of the laser beam for reducing the power of said laser beam following the negative lens.

3. The apparatus according to claim 1 in which said optical means has a beam splitter for reflecting said laser beam into a focusing lens while allowing a predetermined portion of the energy from said laser beam to pass through said beam splitter to impinge upon an energy measuring means.

4. The apparatus according to claim 1 having a lamp located inside said casing for illuminating said platform.

* * * * *